United States Patent [19]

Steinwandel et al.

[11] Patent Number: 5,782,085
[45] Date of Patent: Jul. 21, 1998

[54] METHOD AND APPARATUS FOR CONTINUOUSLY REMOVING NITROGEN OXIDES IN EXHAUST GASES OF INTERNAL COMBUSTION ENGINES

[75] Inventors: Jürgen Steinwandel, Oberuhldingen; Jörg Höschele, Friedrichshafen; Martin Stöer, Immenstaad; Rainer Willneff, Markdorf; Theodor Staneff, Bermatingen, all of Germany

[73] Assignee: Dornier GmbH, Friedrichshafen, Germany

[21] Appl. No.: 629,044

[22] Filed: Apr. 8, 1996

[30] Foreign Application Priority Data

Apr. 7, 1995 [DE] Germany ............... 195 13 250.5

[51] Int. Cl.$^6$ ............... B01D 53/92; F01N 3/10
[52] U.S. Cl. ............ 60/274; 60/275; 204/157.3; 423/212; 423/235
[58] Field of Search .......... 60/274, 275, 303; 204/157.3; 423/212, 235

[56] References Cited

U.S. PATENT DOCUMENTS

| | | | |
|---|---|---|---|
| 3,979,193 | 9/1976 | Sikich | 60/275 X |
| 4,076,606 | 2/1978 | Suzuki et al. | 204/157.3 |
| 5,155,994 | 10/1992 | Muraki et al. | 60/275 |
| 5,397,555 | 3/1995 | Steinwandel et al. | 204/157.3 X |
| 5,526,641 | 6/1996 | Sekar et al. | 60/274 |
| 5,649,517 | 7/1997 | Poola et al. | 60/274 X |

FOREIGN PATENT DOCUMENTS 36 42 018  6/1987  Germany.

OTHER PUBLICATIONS

"Studies of the selective reduction of nitric oxide by hydrocarbons" Petunchi et al., Applied Catalysis B: Environmental, 2 (1993), pp. 303–321.

"Catalytic decomposition of nitrogen monoxide over copper–exchanged zeolites...." Iwamoto et al., Stud. Surf. Sci. Catal., Jan. 1989, pp. 219–226.

"Decomposition of NO by $Ba_2YCu_3O_{7-\delta}$." K Tabata, Journal of Materials Science Letters 7 (1988), pp. 147–148.

"Gmelins Handbuch der Anorganischen Chemie Stickstoff (Handbook of Inorganic Chemistry—Nitrogen)," vol. 3, Nitrogen Compounds with Oxygen, Chemie (1936).

"Effect of nitrogen–containing plasmas on stability, NO formation and sooting flames," Hilliard et al., Nature vol. 259, Feb. 19, 1976, pp. 556–557.

"Untersuchungen zur Erweiterung des Einstatzbereiches der katalytischen $NO_x$–Minderung im Hinblick auf Sauerstoffpartialdruck, Temperatur und Katalysatorgifte," Steinwandel et al., BMFT 01 VQ 134, Aug. 15, 1988, pp. 128–156.

Primary Examiner—Tony M. Argenbright
Attorney, Agent, or Firm—Evenson, McKeown, Edwards & Lenahan, P.L.L.C.

[57] ABSTRACT

The invention relates to a method for continuously removing nitrogen oxides in exhaust gases of internal combustion engines containing an excess of oxygen by feeding a reactive nitrogen-containing plasma jet into the exhaust gas stream, wherein the plasma jet is generated by electromagnetic high-frequency fields.

20 Claims, 3 Drawing Sheets

METHOD AND APPARATUS FOR CONTINUOUSLY REMOVING NITROGEN OXIDES IN EXHAUST GASES OF INTERNAL COMBUSTION ENGINES

BACKGROUND AND SUMMARY OF THE INVENTION

The present invention relates to a method, as well as an apparatus, for continuously removing nitrogen oxides in exhaust gases of internal combustion engines, particularly for use in motor vehicles.

Controlled or uncontrolled three-way catalysts, which are known for gasoline engines, cannot be used to diminish the nitrogen oxide content from the exhaust of diesel engines because of the large excess of air (oxygen).

The selective catalytic reduction of $NO_x$ with ammonia on heterogeneous catalysts used in stationary operations, such as in power plants, is an acceptable method for diminishing nitrogen oxides in combustion exhaust gases with a high oxygen content ($NH_3$—SCR). For the most part, full contact catalysts with $TiO_2$ supports and additional active doping with $V_2O_5/WO_3$ have turned out to be successful catalysts.

However, the $NH_3$—SCR technology cannot just be transferred for application in motor vehicles (with lean gasoline engines or diesel engines). This is because, on the one hand, storage units for pure ammonia as well as for ammonia precursors (such as urea) cause appreciable safety concerns and, on the other, because the catalysts are difficult to adapt to the dynamic driving conditions present aboard motor vehicles. Additionally, there are significant control problems.

In view of the special problems associated with $NO_x$ in diesel engines, catalysts and methods are currently being developed which use hydrocarbons as selective $NO_x$ reducing agents (hydrocarbon-SCR).

However, decisive breakthroughs in technology (for example, using copper-containing zeolite catalysts) have not been noted to date. Even in the case of the hydrocarbon-SCR method, a targeted adaptation to the dynamic operation of an engine is not foreseeable (for example, see German Patent No. DE 3,642,018 and Petunchi et al., Appl. Catal. B2 (1993)).

Alternatives to the selective, heterogeneous, catalysis method for diminishing NO and which are directed to diesel engines, are based on the fact that, under all practical and relevant exhaust gas conditions, NO is thermodynamically unstable with respect to decomposition into the elements ($2NO \rightarrow N_2+O_2$). However, the possibly thermodynamically limiting NO concentrations are not attained in practice, because of the kinetic inhibition of the decomposition of the NO reaction. The unimolecular decomposition of NO requires a high activation energy (approximately 150 kcal/mole), meaning that rapid decomposition requires temperatures which are not available in combustion exhaust gases. It is therefore generally the case that, strictly thermal gas phase processes for diminishing NO in combustion exhaust gases by heating the whole stream of exhaust gas, are completely unrealistic in a technical sense, in terms of material problems and intolerable energy costs, because of the high gas temperatures required.

The possibility of the heterogeneous, catalytic splitting of NO into nitrogen and oxygen without other chemical additives, by lowering the activation energy of the decomposition and thus clearly lowering the reaction temperature (which is required and associated with the activation energy), is described in the literature (see Iwamoto et al., *Metal-doped Zeolites*, Chemistry Lett. (1990); Tabata et al., *Perowskit Catalysts*, J. Mat. Scie. Lett. 7 (1988)). However, up to now, adequate reaction rates required for technical applications could not be achieved.

A completely different method which avoids the above mentioned restrictions, follows from the extremely high activation energy required for the decomposition of NO, consisting of the following reaction sequences:

$$NO+N° \rightarrow N_2+O° \qquad (1)$$

$$O°+NO \rightarrow O_2+N° \qquad (2)$$

The overall reaction resulting from the addition of the two reaction equations is: $2NO \rightleftharpoons N_2+O_2$, which corresponds to the decomposition reaction of NO.

The essential advantage of this reaction sequence consists in the fact that nitrogen atoms react extremely selectively with NO as compared to other free radical reactions. This notion has been described in Gmelin, *Handbuch der Anorganischen Chemie Stickstoff (Handbook of Inorganic Chemistry - Nitrogen)*, Volumn 3, Nitrogen Compounds with Oxygen, Chemie (1936).

The generation of adequate amounts of primary nitrogen radicals (from nitrogen) is problematic, however, plasma-chemical methods come to mind. The literature, such as Hilliard and Weinberg, Nature 259 (1976) and J. Steinwandel et al. BMFT 01 VQ 134 (1988), describes methods wherein nitrogen radicals are produced in adequate amounts by high-temperature splitting of $N_2$ in thermal arc plasmas and fed over an expanding plasma jet into an NO-containing exhaust gas. Both cases demonstrate the basic method. However, it was found during more extensive investigations, that the problems associated with the electrodes of the arc burner could not be managed under technical conditions. Particularly problematic was the consumption of electrodes leading to greatly shortened service lives.

It is therefore an object of the invention to provide a method for the removal of nitrogen oxides by using a nitrogen-containing plasma jet which avoids the above-mentioned disadvantages with the electrodes.

This objective and other objectives are accomplished with a method for continuously removing nitrogen oxides in the exhaust gases of internal combustion engines with an excess of oxygen, by feeding a reactive, nitrogen-containing plasma jet into the exhaust gas stream, wherein the plasma jet is generated by electromagnetic high-frequency fields. The objectives of the present invention are also accomplished by the claimed apparatus for carrying out the method.

According to the present invention, the plasma jet is generated by high-frequency electromagnetic fields. As such, electrodes used conventionally for generating plasma are thus not required anymore.

The following can be used, for example, as plasma gas: pure nitrogen, air and air highly enriched with nitrogen.

Moreover, in a further embodiment, the exhaust gases, purified by the inventive method, can be recycled and used as plasma gas.

The inventive method is suitable for diminishing nitrogen oxides in the exhaust gases of all piston engines and thermal flow machines.

In terms of the technical applicability of the present method to exhaust systems, typical high-pressure plasmas (where $p \geq 1$ bar) are required. When generating plasmas with high-frequency fields, the coupling of the high-frequency energy depends in the case of nonmagnetic materials, on the complex dielectric constant of the material:

$$\epsilon = \epsilon' + i\epsilon'' \tag{3}$$

or on the dielectric loss angle σ:

$$\tan \sigma = \epsilon''/\epsilon' \tag{4}$$

ε is, among other things, a function of the temperature and the frequency.

The volume-specific absorption of high-frequency energy in a high-frequency-absorbing material is given by:

$$P_{abs} = \pi v \epsilon'' |E|^2 \tag{5}$$

in which ν is the frequency and E the average electrical field strength in the absorbing volume. For materials, the losses are defined predominantly by the electric conductivity.

$$\epsilon'' = \sigma/2\pi \cdot v \tag{6}$$

in which σ is the electrical conductivity in $(\Omega m)^{-1}$. As such, the volume specific absorption is $$P_{abs} = \frac{\sigma}{2} |E|^2 \tag{7}$$

The electromagnetic field penetrating an absorbing volume is attenuated by the absorption. This results in a depth of penetration $d_c$, which is limited depending on the material and the frequency of the electromagnetic field:

$$d_c = c/2\pi v \left( \frac{2 \cdot \epsilon_O}{\epsilon'((1+\tan^2\sigma)^{1/2}-1)} \right)^{1/2} \tag{8}$$

where $c=3\times10^8$ m/sec and the velocity of light $\epsilon_O=8.859\times 10^{-12}$ Asec/Vm$_O$.

When generating plasmas with high-frequency energy, it is necessary to differentiate between the process of igniting the plasma and the process of maintaining a stationary plasma.

In gases, the electrical conductivity σ is slight, so that relatively high local field strengths are required to ignite the plasma (breakdown). In air, such breakdown field strengths are between 10 and 25 kV/cm.

As soon as such a plasma breakdown is realized, the relevant electromagnetic material properties change drastically. For example, the complex dielectric constant ε mainly changes in the imaginary portion iε", which in turn affects equation (4) and the conductivity σ.

In particular, the conductivity σ changes by several powers of ten because of the existence of free charge carriers.

The electric conductivity of fully ionized plasma (full thermodynamic equilibrium (FTE) or local thermodynamic equilibrium (LTE)) can be derived in general from the Boltzmann collision equation on the assumption that the gas is an ideal Lorentz gas (fully ionized with no electron interaction and with the ions at rest).

The following equations result:

$$\sigma = 0.58 \frac{64 \, (2\pi)^{1/2} e_O^2 k_B^{3/2}}{e_O^2 (m_{e1})^{1/2} \times \ln A} T^{3/2} \tag{9}$$

$$A = \frac{12\pi \, (\epsilon_O k_B)^{3/2}}{e_O^3} T^{3/2} N_{e1}^{-1/2} \tag{10}$$

where $e_O$: primary electric charge,
$m_{e1}$: electron mass,
$N_{el}$: electron particle density.

Under FTE and LTE conditions, $N_{el}$ is given by the Saha-Eggert equation:

$$\frac{N_{e1} N_i^+}{N_a} = 2 \frac{Z_i(T)}{Z_a(T)} \frac{(2\pi m_{e1} k_B)^{3/2}}{h^3} \cdot T^{3/2} \exp(-E_i/k_B T) \tag{11}$$

where $N_i$: ion particle density,
$N_a$: neutral gas molecule particle density,
$Z_{i,a}$: partial system functions,
$E_i$: ionization energy.

The temperature-dependent electrical conductivities of FTE and LTE plasmas are determined primarily by the collision cross sections between free electrons and, in the final analysis, are thus proportional to the number density $N_{el}$ of the free electrons.

The presence of considerable concentrations of free charge carriers after the plasma is ignited affects the behavior of the stationary plasma with respect to coupling (or maintaining the plasma state) of high-frequency power.

The question thus arises as to the possibility of spreading electromagnetic waves in a (fully ionized) plasma.

Different electromagnetic waves can be formed in such media because of the different properties of electron gas and ion gas, as well as because of the following acceleration properties:

electrostatic (Coulomb) forces magnetic (Lorentz) forces forces resulting from viscosities (Stokes forces)

forces resulting from pressure gradients.

For the special case in which the interactions are exclusively coulombic, without a stationary magnetic field and with the additional boundary conditions under which the attenuation disappears, σ→∞, the charge is maintained and there is quasi neutrality in the plasma. The following equations follow for plane electromagnetic waves:

$$\Delta E - (\omega_p^2/c^2)E - \frac{1}{c^2} \partial^2 E/\partial t^2 = 0 \tag{12}$$

with the dispersion relationship:

$$\omega_p = (N_{el} e_O^2/(m_{el}\epsilon_O))^{1/2} \tag{13}$$

where $\omega_p$ is the characteristic plasma (Langmuir) frequency.

According to the above, transverse electromagnetic waves can spread in a stationary plasma only if ω>$\omega_p$. If ω<$\omega_p$, there is a cut-off resulting from the total reflection of the incoming electromagnetic waves and no further absorption of high-frequency energy. Further heating of the plasma is then no longer possible.

For example, in an FTE/LTE nitrogen plasma using a high frequency of 2.46 GHz (domestic microwave magnetron), electromagnetic waves of this frequency ($\omega_p$) are no longer capable of spreading from a free electron concentration of about $7.5\times10^{10}$ cm$^{-3}$. This corresponds to a plasma temperature of about 5000° K.

In the presence of stationary electric and magnetic fields, there are additional possibilities for absorptive plasma states (based on equation (13)). These are the states of the electron and ion cyclotron frequency in the case of transfer of stationary magnetic fields of induction B.

Starting out from the definition of the Lorentz force, where $F_L=[v\times B]$, and its action as a centrifugal force, where $F_L=v^2/r$, the following equation is obtained generally for the gyration frequency:

$$\omega_g = v/r = (e_O/m) \cdot B \tag{14}$$

(in the case of simple ionization)

where $m = m_{el}$: electron cyclotron resonance $m = M_{ion}$: ion cyclotron resonance In the example of the plasma-generating frequency of 2.45 GHz mentioned above, the necessary induction B is calculated to be 0.0876 Tesla (T) for electron cyclotron resonance.

Additional possibilities for maintaining the plasma arise in the event that the Langmuir criterion (equation (13)) is actually intended to prevent a further spread of the waves in the plasma.

The electrodynamic criteria for generating and maintaining plasmas, given above, can be realized technically using a high frequency as demonstrated below.

When a typical radio frequency (RF) approximately 10–100 MHz is used, high field strengths E are preferably generated by inductive coupling through a coil, comprising the sample volume, as a component of an RF resonance circuit (inductive coupled plasma (ICP)).

A capacitive RF coupling, in which the sample volume is terminated by a capacitor, is also possible.

In a preferred embodiment of the present invention, typical microwave frequencies (microwaves in the range of between 0.95 and 24 GHz for example) are used. In this case, the electromagnetic waves are advantageously guided over waveguides. Because of their geometry, which can be precisely defined, these waveguides permit only certain wave types. The high frequency can be generated either by magnetron systems or by traveling wave tubes.

The following steps are necessary in order to generate plasma with microwave frequencies (such as 2.45 GHz):

generating the microwave radiation and coupling it to a waveguide dissipating the wave in the waveguide uncoupling the wave into the plasma gas (also known as plasma reaction gas).

The following two configurations are preferred for generating high field strengths for plasma applications:

field compression (E vector) in rectangular waveguide systems, such as R-26 for 2.45 GHz technology ($H_{10}$ geometry), achieving additional field concentrations in the waveguide with capacitative stubs;

excitation of fundamental electrical or magnetic modes (such as $E_{010}$, $H_{111}$) or higher modes in cylindrical cavity resonators.

In either case, it is possible to attain the primary breakdown field strength required for the generation of stationary plasma.

Moreover, it is possible to lower the electrical field strength required for the plasma breakdown by increasing the (gas) conductivity σ, for example, by feeding in electrons/ions using a suitable arrangement (ignition flame, field ignition, auxiliary plasma over a corona or an arc/spark discharge).

It is furthermore possible to superimpose a brief high-frequency pulse (with a pulse width of about 1 msec) on the stationary excitation field or to reduce pressure in order to ignite the plasma (breakdown).

Other objects, advantages and novel features of the present invention will become apparent from the following detailed description of the invention when considered in conjunction with the accompanying drawings.

DETAILED DESCRIPTION OF THE PREFERRED EMBODIMENTS

A) An Example with a Rectangular Waveguide

At a given frequency, the dimensions of a waveguide basically determine the wave spread limits. A differentiation is made between transverse electric ($E_{mn}$) and transverse magnetic ($H_{mn}$) waves. The subscripts m and n refer to the number of wave maxima (amplitudes) in the x and y direction respectively. The most stable wave shape in a rectangular waveguide is the so-called $H_{10}$ wave. This has the longest critical wavelength (limiting wave length $\lambda_k$). The dimensions of the waveguide can therefore be selected so that there is no spreading of other wave types.

The limiting wavelength is calculated as follows:

$$\lambda_k = 2/[(m/a)^2 + (n/b)^2]^{1/2} \tag{15}$$

and for the $H_{10}$ wave (where m=1, n=0)

$$\lambda_k = 2 \cdot a \tag{16}$$

In the most cases, rectangular waveguide systems, which cause little attenuation, have a width to height ratio a/b of 2.

It should furthermore be noted that the waveguide wavelength $\lambda_H$ is greater than the free space wavelength $\lambda_O$. Therefore, in the absence of losses:

$$\lambda_H = \lambda_O/[(1-\lambda_O/\lambda_k)^2]^{1/2} \tag{17}$$

At 2.45 GHz, a waveguide wavelength (R-26) of 171.97 mm is thus obtained for the basic $H_{10}$ mode.

The following physical boundary conditions are essential for designing a waveguide for the generation of stationary plasma:

the microwave is preferably coupled at the E field maximum;

for fine tuning, stubs (tuning pins) can be placed at defined intervals in the waveguide.

Figure 1:
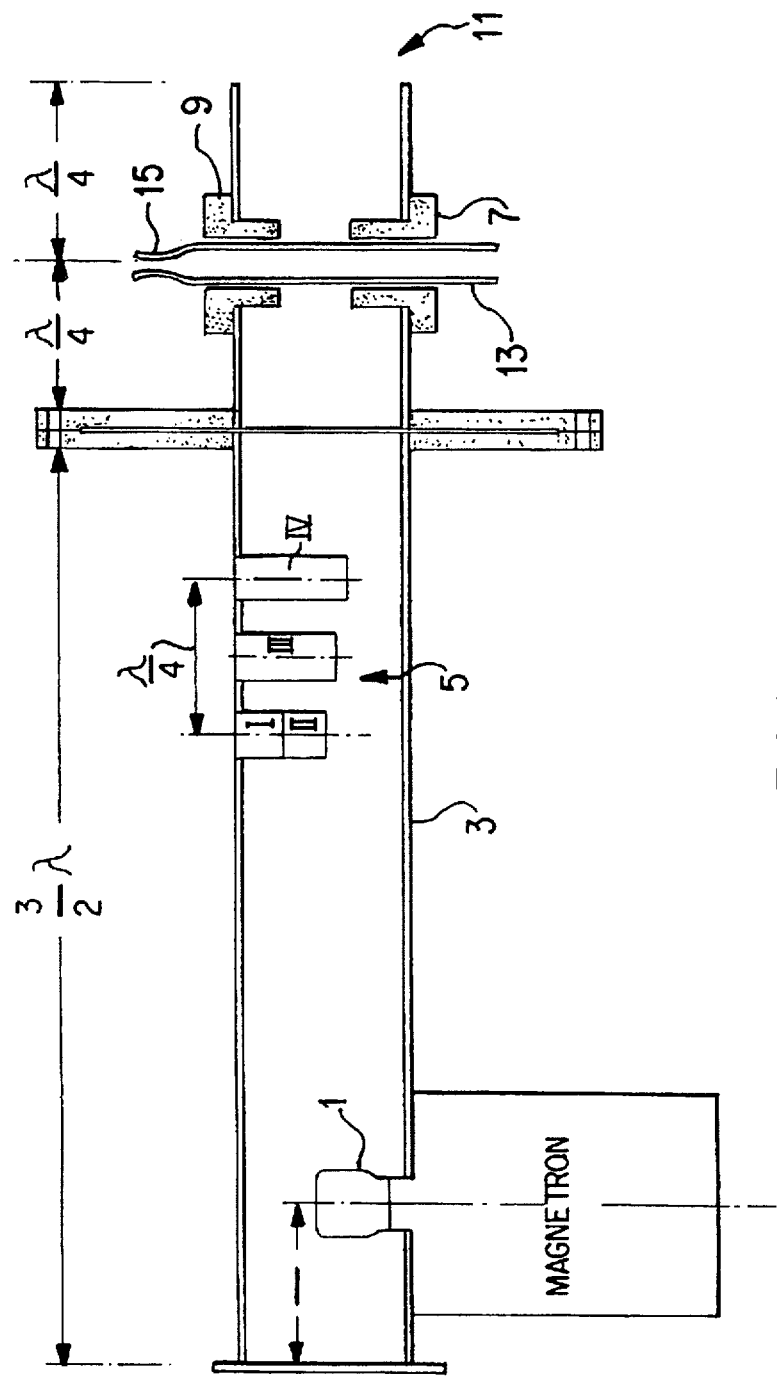
FIG. 1 shows a preferred embodiment for the apparatus of the present invention for generating a plasma jet in an R-26 waveguide for 2.45 GHz microwaves.

FIG. 1 shows an R-26 waveguide system, which is preferred for producing stationary plasmas. The width of the waveguide is 86.36 mm and the height is 43.18 mm. The longitudinal dimensions can be seen on FIG. 1. The microwave radiation, coming from the magnetron, is coupled into the waveguide 3 over a radiation head 1. For fine tuning, stubs 5 (tuning stubs) are placed in the waveguide at defined intervals. The microwave is capacitively uncoupled into the plasma reaction gas through two hollow stubs $\lambda_{H/4}$ 7, 9 in front of the open end 11 of the waveguide. The dielectric reaction tube 13 (quartz, for example), in which the plasma gas is contained, is passed through the two hollow stubs 7, 9. At one end, the reaction tube 13 is closed off by a contoured nozzle 15. The plasma gas is fed as a plasma jet, through the nozzle 15 into the exhaust gas stream (not shown here) which is to be purified.

B) Example with a Cavity Resonator

The field strength required to ignite plasma in the exhaust gas stream can be achieved in cavity resonators even at atmospheric pressure. Although, in principle, any shape and mode are possible, the $E_{010}$ mode of the cylindrical resonator is particularly preferred because of the field distribution.

The characteristic frequency of a cylindrical resonator with a radius R in the $E_{010}$ mode is given independently of its length by $$v = 2.405 \, c/2\pi R \tag{18}$$

At a resonance frequency of 2.45 GHz, this amounts to a radius of 47 mm. The quality when the power is adapted (half the unloaded operation quality) is calculated to be $$Q = ((\sigma/\pi\epsilon_0 v)^{1/2} 2.405/(4*(1+R/L))) \tag{19}$$

In order to operate the fundamental mode in a stable manner, the length L must not exceed 2R. In this case, the quality obtained for a brass resonator is Q=7750.

From the quality and the power dissipation $P_d$ in the resonator, the maximum field strength can be calculated from $$E^2 = 2Z_0/(2.405\pi \, \mu J_1^2(2.405)) Q P_d / LR \tag{20}$$

An approximately 50-fold increase in field strength from that attained with the R-26 waveguide is thus achieved (approximately 9 kV/cm at a power dissipation of 800 W).

Figure 2:
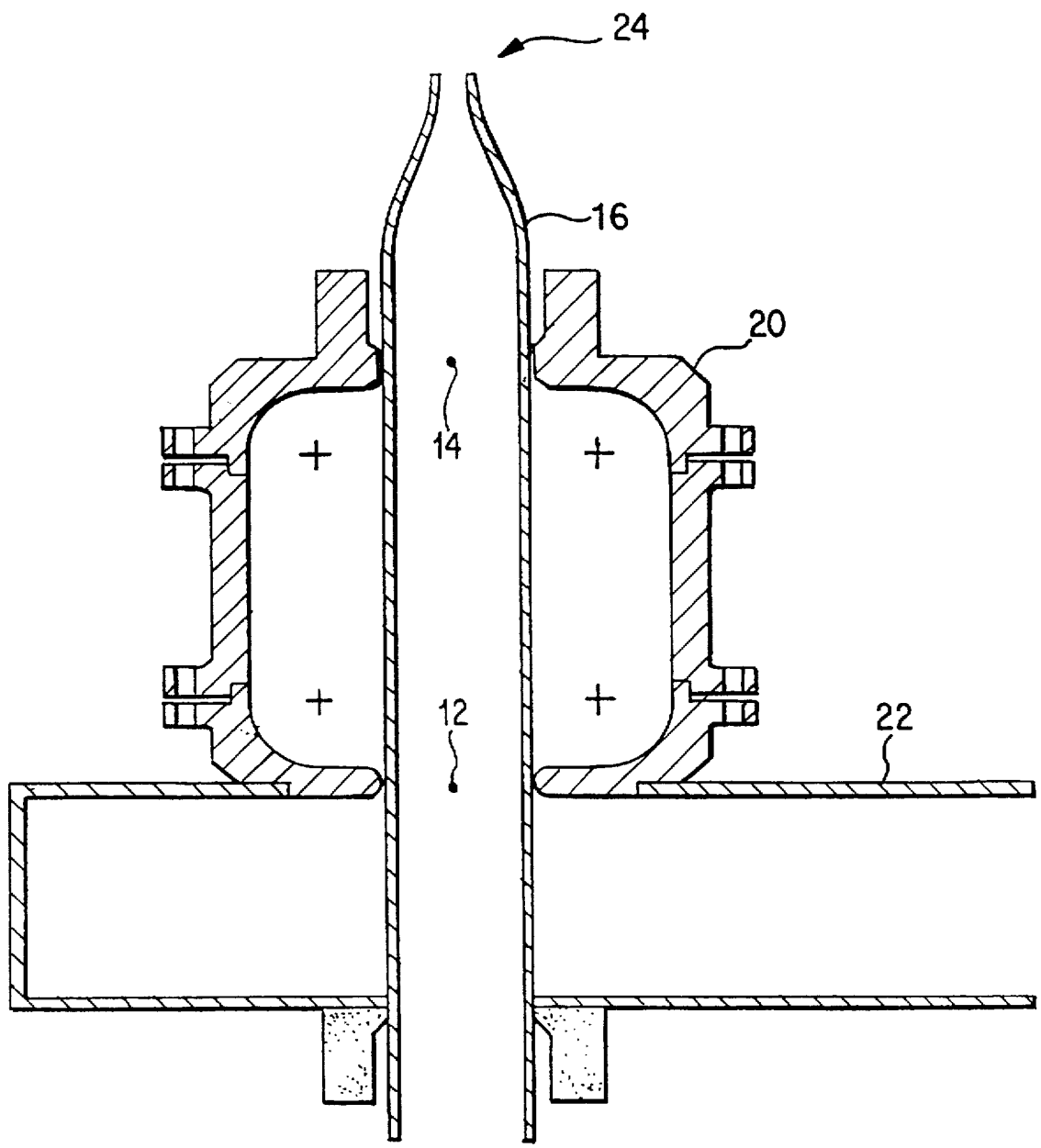
FIG. 2 shows another preferred embodiment for the apparatus of the present invention for generating a plasma jet by iris coupling of an R-26 waveguide with a cylindrical resonator for 2.45 GHz microwaves.

FIG. 2 shows a preferred apparatus for generating a plasma jet with a cylindrical resonator. A central circular hole aperture 12, 14 is found at each end face of the cylindrical resonator 20. The reaction tube 16, through which the plasma gas is passed, extends through the opposite openings 12, 14. In order to avoid contaminating the resonator 20, a material with a low microwave absorption (quartz, aluminum, etc.) is selected for the reaction tube 16. A waveguide 22, such as an R-26 waveguide, coupled with magnetron-generated microwaves with a frequency of 2.45 GHz extends parallel to the end surface of the cylindrical resonator 20. The cylindrical resonator 20 is excited by this microwave radiation, the coupling taking place over the two circular hole apertures 12, 14 at the end faces of the cylindrical resonator 20. These circular hole apertures 12, 14 serve as coupling holes to excite the cylindrical resonator 20, as well as to guide the plasma gas. The position and dimensions of the coupling holes 12, 14 can be varied in order to adapt them to the power. An alternative to being excited by coupling over coupling holes, is to excite the resonators over antennas (inductive or capacitive).

After the plasma is ignited by the microwave energy taken up by the cavity resonator 20, the cavity resonator absorbs no further energy from the waveguide 22. The microwave radiation in the waveguide 22 is now coupled directly into the plasma gas. The plasma zone within the reaction tube 16 is then no longer in the region of the cylindrical resonator 20 and, instead, is in the region of the waveguide 22. The reaction tube 16 is closed off at one end by a contoured nozzle 24. The plasma gas is now fed as a plasma jet through this nozzle 24 into the exhaust gas stream which is to be purified.

Figure 3:
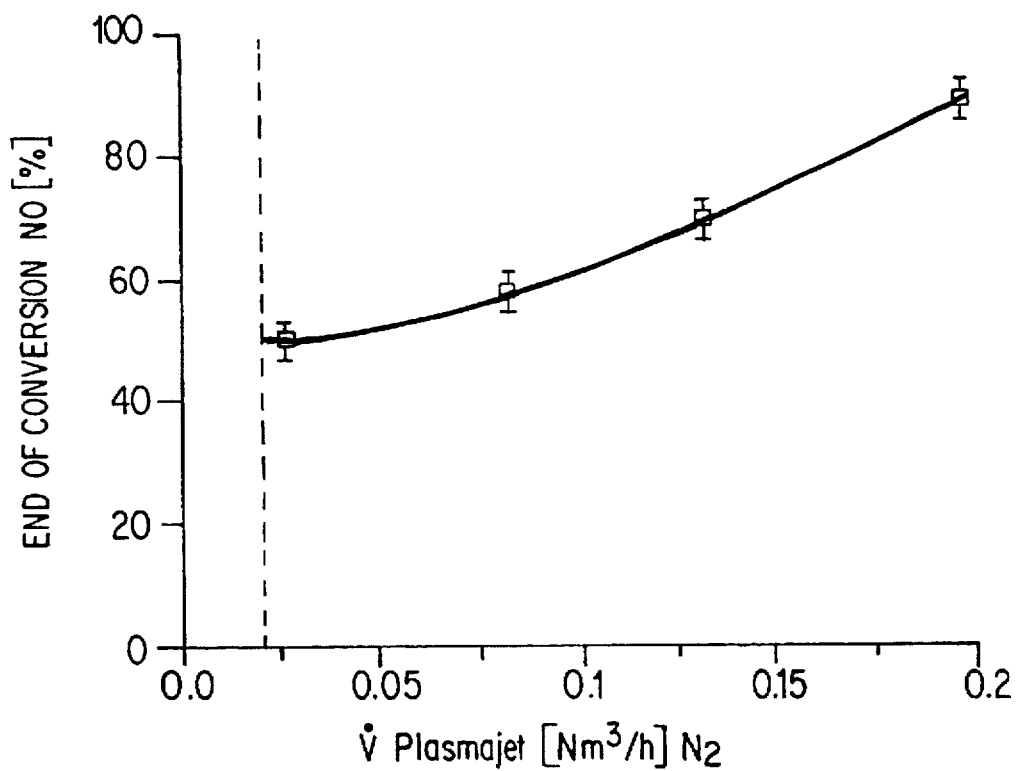
FIG. 3 is a graph showing the experimental results obtained using a preferred embodiment of the present invention.

Preferred parameters for carrying out the examples are:

Oscillation mode of cylindrical resonator: $E_{010}$
Oscillation mode of waveguide: $H_{10}$
Waveguide: Rectangular waveguide R-26
Frequency: 2.45 GHz FIG. 3 shows the experimental results for removing nitrogen oxide by feeding a nitrogen plasma jet into a synthetic diesel exhaust gas containing 0.1% NO, 5% oxygen and 94.9% nitrogen. These results were obtained using the apparatus shown in FIG. 1. The flow volume of the exhaust gas was 1 Nm³/h. The flow volume is plotted on the abscissa and the NO conversion of the ordinate.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for continuously removing nitrogen oxide from exhaust gas stream of internal combustion engines containing an excess of oxygen, comprising the steps of:
   generating a reactive, nitrogen-containing plasma jet of a plasma pressure of at least 1 bar from plasma gas by electromagnetic high-frequency fields, and
   feeding the plasma jet into the exhaust gas stream to obtain a purified exhaust gas stream.

2. The method as claimed in claim 1, comprising the step of generating the plasma jet by using microwaves having a frequency in the range of from 0.95 GHz to 24 GHz.

3. The method as claimed in claim 2, wherein the frequency is 2.45 GHz.

4. The method as claimed in claim 2, comprising the step of generating the plasma in a rectangular waveguide in the $H_{10}$ mode.

5. The method as claimed in claim 4, comprising the step of capacitively coupling the microwaves into the plasma gas.

6. The method as claimed in claim 1, comprising the step of generating the plasma in a cavity resonator in the $E_{010}$ mode, wherein the cavity resonator is excited with a rectangular waveguide in the $H_{10}$ mode over iris coupling.

7. The method as claimed in claim 1, comprising the step of feeding the plasma jet over a contoured nozzle into the exhaust gas stream.

8. The method as claimed in claim 1, comprising the step of igniting the plasma jet with a brief high-frequency pulse.

9. The method as claimed in claim 1, comprising the step of igniting the plasma jet with electric charge carriers by at least one of flame ionization, field emission, corona discharge, spark and arc discharge.

10. The method as claimed in claim 1, wherein the plasma gas is pure nitrogen, air or air highly enriched with nitrogen.

11. The method as claimed in claim 1, wherein the plasma gas is in part feedback of the purified exhaust gas stream.

12. The method as claimed in claim 1, comprising the step of generating the plasma jet in at least one of stationary electrical and magnetic fields.

13. The method as claimed in claim 1, comprising the step of igniting the plasma jet by at least one of ionizing, corpuscular radiation and electromagnetic radiation.

14. An apparatus for continuously removing nitrogen oxides in exhaust gas streams of internal combustion engines containing an excess of oxygen by generating a reactive, nitrogen-containing plasma jet of a plasma pressure of at least 1 bar from plasma gas, which is fed into the exhaust gas stream of the internal combustion engine, wherein the apparatus comprises:

a microwave source; and a rectangular waveguide which couples the microwaves and comprises at least two hollow stubs, and a dielectric pipeline which contains the plasma gas which passes through the hollow stubs.

15. The apparatus as claimed in claim 14, wherein a contoured nozzle is found at one end of the dielectric pipeline which contains the plasma gas.

16. The apparatus as claimed in claim 14, wherein the rectangular waveguide is a type R-26 waveguide.

17. An apparatus for continuously removing nitrogen oxides from exhaust gas streams of internal combustion engines containing an excess of oxygen by generating a reactive nitrogen-plasma jet of a plasma pressure of at least 1 bar from plasma gas, which is fed into the exhaust gas stream of the internal combustion engine, wherein the apparatus comprises:

a microwave source;

a rectangular waveguide which couples the microwaves; and a cavity resonator, which is excited over iris coupling by microwave radiation guided by the rectangular waveguide.

18. The apparatus as claimed in claim 17, wherein the cavity resonator is a cylindrical resonator with openings which serve as coupling holes for exciting the resonator and through which a dielectric pipeline which contains the plasma gas, is passed and disposed of at the end surfaces.

19. The apparatus as claimed in claim 17, wherein a contoured nozzle is found at one end of the dielectric pipeline which contains the plasma gas.

20. The apparatus as claimed in claim 17, wherein the rectangular waveguide is a type R-26 waveguide.

* * * * *